(12) United States Patent
Arazaki

(10) Patent No.: US 8,804,198 B2
(45) Date of Patent: Aug. 12, 2014

(54) PRINTING DATA GENERATING APPARATUS, PRINTING DATA GENERATING METHOD, AND PRINTING DATA GENERATING PROGRAM

(75) Inventor: Shinichi Arazaki, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 148 days.

(21) Appl. No.: 13/417,620

(22) Filed: Mar. 12, 2012

(65) Prior Publication Data

US 2012/0229864 A1 Sep. 13, 2012

(30) Foreign Application Priority Data

Mar. 11, 2011 (JP) .................................. 2011-054021

(51) Int. Cl.
*H04N 1/405* (2006.01)
(52) U.S. Cl.
USPC .......................................... 358/3.2; 358/1.18
(58) Field of Classification Search
USPC ............ 358/1.7–1.9, 2.1, 3.2, 1.18, 400, 406, 358/500, 504, 468
See application file for complete search history.

(56) References Cited

U.S. PATENT DOCUMENTS

| 7,032,987 B2* | 4/2006 | Bhattacharjya et al. ......... 347/12 |
| 7,570,402 B2* | 8/2009 | Yoshida .......................... 358/521 |
| 7,787,147 B2* | 8/2010 | Yoshida et al. ................. 358/1.8 |
| 2007/0176965 A1 | 8/2007 | Arazaki |

FOREIGN PATENT DOCUMENTS

| JP | 2002-292908 A | 10/2002 |
| JP | 2007-106066 A | 4/2007 |
| JP | 2007-230213 A | 9/2007 |
| JP | 2007-230218 A | 9/2007 |

* cited by examiner

*Primary Examiner* — Thomas D Lee
*Assistant Examiner* — Stephen M Brinich
(74) *Attorney, Agent, or Firm* — Nutter McClennen & Fish LLP; John J. Penny, V

(57) ABSTRACT

A printing data generating apparatus acquires image data; classifies, upon causing a printer to execute a printing process for printing a line in an N-th main scanning operation between lines printed in (N−1)-th or earlier main scanning operations and printing a print unit formed with a plurality of lines by performing Nmax main scanning operations, pixels on the plurality of lines into groups based on the image data such that each group includes the pixels that are to be printed in the same main scanning operation; identifies, among the groups, the group with the highest ink usage for printing the pixels of the group based on the image data; and generates, based on the image data, printing data for causing the printer to print an image represented by the image data by printing the pixels of the group with the highest ink usage in the Nmax-th main scanning operation.

3 Claims, 3 Drawing Sheets

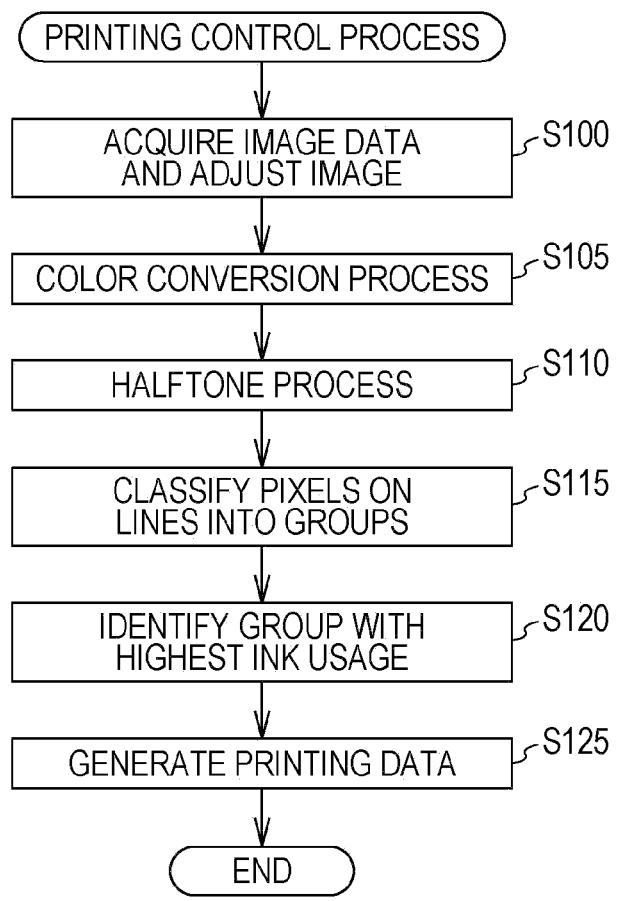

PRINTING DATA GENERATING APPARATUS, PRINTING DATA GENERATING METHOD, AND PRINTING DATA GENERATING PROGRAM

BACKGROUND

1. Technical Field

The present invention relates to a printing data generating apparatus that generates printing data for causing a printer to perform printing.

2. Related Art

Ink jet printers perform printing by repeatedly performing a main scanning operation and a sub scanning operation. In a main scanning operation, while moving a print head having a plurality of nozzles in a predetermined direction, ink is ejected from each of the nozzles. Thus, a plurality of lines are printed on a printing medium. After completion of printing of the plurality of lines, a sub scanning operation is performed in which the print head is moved in a direction perpendicular to the above-mentioned predetermined direction. Further, in order to achieve printing at high resolution by printing dots at intervals less than the intervals at which the nozzles are arranged, there has been developed a technique for printing a line in the N-th main scanning operation between lines printed in the (N−1)-th or earlier main scanning operations (see, for example, JP-A-2002-292908).

With the technique disclosed in JP-A-2002-292908, however, it is impossible to prevent a misalignment between the position of a line printed at an earlier timing and the position of a line printed at a later timing. That is, in the ink jet printers, once ink has been ejected onto a printing medium, the ink penetrates into the printing medium, so that the printing medium becomes more likely to expand. In the case of performing a plurality of main scanning operations to complete printing of a plurality of lines, a large amount of ink has already been penetrated into a printing medium when the last main scanning operation is performed. Accordingly, when the last main scanning operation is performed, the printing medium is expanded by a greater degree than when the earlier main scanning operations were performed. This results in a misalignment between the position of the lines in the earlier main scanning operations and the position of the lines in the last main scanning operation. Such misalignment is more pronounced when a greater number of nozzles are provided in a print head. Accordingly, in the case of printers having a print head of such a size that printing is possible from one edge to another edge of a printing medium, such misalignment is significantly pronounced.

SUMMARY

An advantage of some aspects of the invention is that it provides a technique that can reduce misalignment of line positions due to a difference in the timing of performing main scanning operations.

According to an aspect of the invention, there is provided a printing data generating apparatus that identifies, among groups each including pixels that are to be printed in the same main scanning operation, the group with the highest ink usage based on image data, and generates printing data such that the group with the highest ink usage is printed in an Nmax-th main scanning operation. That is, in a printing system configured to form an image by printing a line in an N-th main scanning operation between lines printed in (N−1)-th or earlier main scanning operations and print a print unit formed with a plurality of lines by performing Nmax main scanning operations, printing data are generated in which the printing order is changed such that the ink usage in each main scanning operation prior to the last (Nmax-th) main scanning operation is relatively less than the ink usage in the last main scanning operation.

If a printer executes, based on the printing data generated with the configuration as described above, a printing process for printing a line in the N-th main scanning operation between lines printed in the (N−1)-th or earlier main scanning operations and printing a print unit formed with a plurality of lines by performing Nmax main scanning operations, the ink usage in each main scanning operation prior to the Nmax-th main scanning operation is relatively less than the ink usage in the Nmax-th main scanning operation among the main scanning operations to be performed to complete printing of the plurality of lines. Accordingly, the expansion of a printing medium due to the ink used in the main scanning operations prior to the Nmax-th main scanning operation is less compared to the case in which a similar amount of ink is used in each main scanning operation. Thus, it is possible to reduce misalignment of line positions due to the difference in the timing of performing the main scanning operations.

A pixel classifying unit may classify pixels on the plurality of lines forming the print unit into groups based on the image data such that each of the groups includes the pixels that are to be printed in the same main scanning operation. That is, in order to evaluate the ink usage in each main scanning operation in the case where a plurality of pixels are printed in a single main scanning operation, the pixels on a plurality of lines may be classified into groups such that each group includes the pixels that are to be printed in the same main scanning operation.

More specifically, the pixels to be printed with ink in the printer are identified in accordance with the pixels represented by the image data. The pixels to be printed with ink in the printer are arranged on a two-dimensional plane, and the pixels arranged in a predetermined direction form a line to be printed by main scanning. For example, in the case of a printer that can eject ink from a print head each time the print head and the printing medium are moved relative to each other by a unit moving distance in a predetermined direction, this movement in the predetermined direction is referred to as main scanning. The pixels arranged in the direction parallel to the predetermined direction to which the ink is ejected in the main scanning form a line to be printed by the main scanning. Further, an operation of moving the print head and the printing medium relative to each other in the direction perpendicular to the predetermined direction is referred to as sub scanning.

Further, in a configuration that forms an image by printing a line in the N-th main scanning operation between lines printed in the (N−1)-th or earlier main scanning operations and prints a print unit formed with a plurality of lines by performing Nmax main scanning operations, a line is printed between the lines that have already been printed to complete printing of the print unit. In this case, main scanning operations are performed in a predetermined order to complete printing of the print unit, and hence the order in which the pixels on the respective lines are printed by the printer is identified based on the order of the main scanning operations. When the order in which the pixels are printed is identified, it becomes possible to classify the pixels on the plurality of lines forming the print unit into groups such that each group includes the pixels that are to be printed in the same main scanning operation.

For instance, in the case of printing a single line with a single main scanning operation, pixels on the line are classified into the same group. In the case of printing a single line with a plurality of main scanning operations, pixels to be printed in different main scanning operations are classified into different groups. Further, in the case where a print head includes a plurality of nozzles and ejects ink from the plurality of nozzles in a single main scanning operation, pixels to be printed by the plurality of nozzles in the single main scanning operation are classified into the same group. The pixels subject to classification may be identified based on the image data. For example, in the case where data indicative of the ink usage are generated for each pixel based on the image data, classifying the pixels is equivalent to classifying such pieces of data into groups.

A group identifying unit may identify the group with the highest ink usage for printing the pixels belonging to the group based on the image data. For example, the group identifying unit may be configured to identify the ink usage of each pixel based on the image data, calculate the sum of the ink usage (total ink usage) of all the pixels of each group based on the ink usage of each pixel, and compare the sums of the respective groups.

A printing data generating unit may generate printing data for causing a printer to print an image represented by the image data by printing the pixels of the group with the highest ink usage in the Nmax-th main scanning operation. That is, since the pixels to be printed in each main scanning operation are identified in accordance with a printing process by the printer, the printing data may be generated by adjusting the printing order such that the pixels of the group with the highest ink usage are printed in the Nmax-th main scanning operation.

Further, in this case, the total ink usage of the pixels to be printed in at least the Nmax-th main scanning operation may be greater than the total ink usage of the pixels to be printed in each of the (Nmax−1)-th and earlier main scanning operations. With respect to the (Nmax−1)-th and earlier main scanning operations, the printing data may be configured such that the total ink usage of the pixels to be printed in a single main scanning operation increases linearly or nonlinearly with the increase in the number of times the main scanning operation is performed.

Further, the printing data may be configured to cause the printer to print the pixels of the group with the highest ink usage in the Nmax-th main scanning operation. Accordingly, if the printing data are configured such that main scanning operations are performed in a predetermined order, the printing data may be configured such that pixels are shifted such that the pixels of the group with the highest ink usage are printed according to the order of the main scanning operations, or may be configured such that the order of the main scanning operations is changed.

It is to be noted that the printer may form an image by printing a line in the N-th main scanning operation between lines printed in the (N−1)-th or earlier main scanning operations. Typically, the printer may be configured to execute a printing process by performing a main scanning operation in a manner such that the ink can be ejected from each of a plurality of nozzles which are arranged in a print head in the sub scanning direction, and performing another main scanning operation to form a line between lines formed in the previous main scanning operations. Further, in this configuration, in the case where M nozzles are arranged in a line in the print head in the sub scanning direction and L lines are printed by performing Nmax main scanning operations, L×M lines form a print unit.

Further, the order in which the Nmax main scanning operations are performed may be configured in various ways so long as the order is determined before identifying the groups of pixels. The main scanning may be performed so as to print a plurality of adjacent lines according to the order in which the lines are arranged. Alternatively, the main scanning may be performed in an order (an order such that a line spaced apart from a printed line by one or more lines is printed) different from the order in which the lines are arranged.

Further, the order of main scanning operations and the number of pixels in the line to be printed with a single main scanning operation can be adjusted appropriately. For example, in a configuration that causes a printer to execute a printing process for printing L lines within a predetermined interval by performing L main scanning operations with use of a print head in which a plurality of nozzles are formed at the predetermined intervals, in the case where line numbers sequentially assigned to the plurality of lines in the order in which the lines are arranged are represented by (an integral multiple of L)+X (X is an integer ranging from 0 to L−1), it is preferable to classify the pixels on the plurality of lines into L groups by classifying the lines having the same value for X into the same group.

That is, in a configuration with which one line is printed with one nozzle when performing one main scanning operation, the same number of lines as the number of nozzles are printed with one main scanning operation. In the case of printing L lines within a predetermined interval by repeating such a main scanning operation L times, lines that are spaced apart by L lines are printed in the same main scanning operation. Accordingly, in the case where the line numbers are represented by (an integral multiple of L)+X, if lines having the same value for X are classified into the same group, it is possible to classify the pixels on the respective lines into groups such that each of the groups includes the pixels that are to be printed in the same main scanning operation. For example, in a configuration with which four lines are printed within a predetermined interval by performing four main scanning operations, in the case where line numbers 1, 2, 3, . . . are assigned to the lines in this order from the top to the bottom, a line with a line number 4×(an integer) (=4, 8, and so on) is classified into one group; a line with a line number 4×(an integer)+1 (=1, 5, and so on) is classified into another group; a line with a line number 4×(an integer)+2 (=2, 6, and so on) is classified into still another group; and a line with a line number 4×(an integer)+3 (=3, 7, and so on) is classified into still another group.

Further, the technique according to the above-described aspect of the invention in which, in the case of printing a print unit formed with a plurality of lines by performing Nmax main scanning operations, pixels of the group with the highest ink usage are printed in the Nmax-th main scanning operation may be implemented as a program or a method. Further, the apparatus, program, and method as described above may be embodied in various forms. For example, the apparatus, the program, and the method may be embodied as an independent apparatus, or may be embodied using shared components in a multifunctional apparatus.

BRIEF DESCRIPTION OF THE DRAWINGS

The invention will be described with reference to the accompanying drawings, wherein like numbers denote like elements.

FIG. 3 is a flowchart showing a printing control process.

DESCRIPTION OF EXEMPLARY EMBODIMENTS

Figure 1:
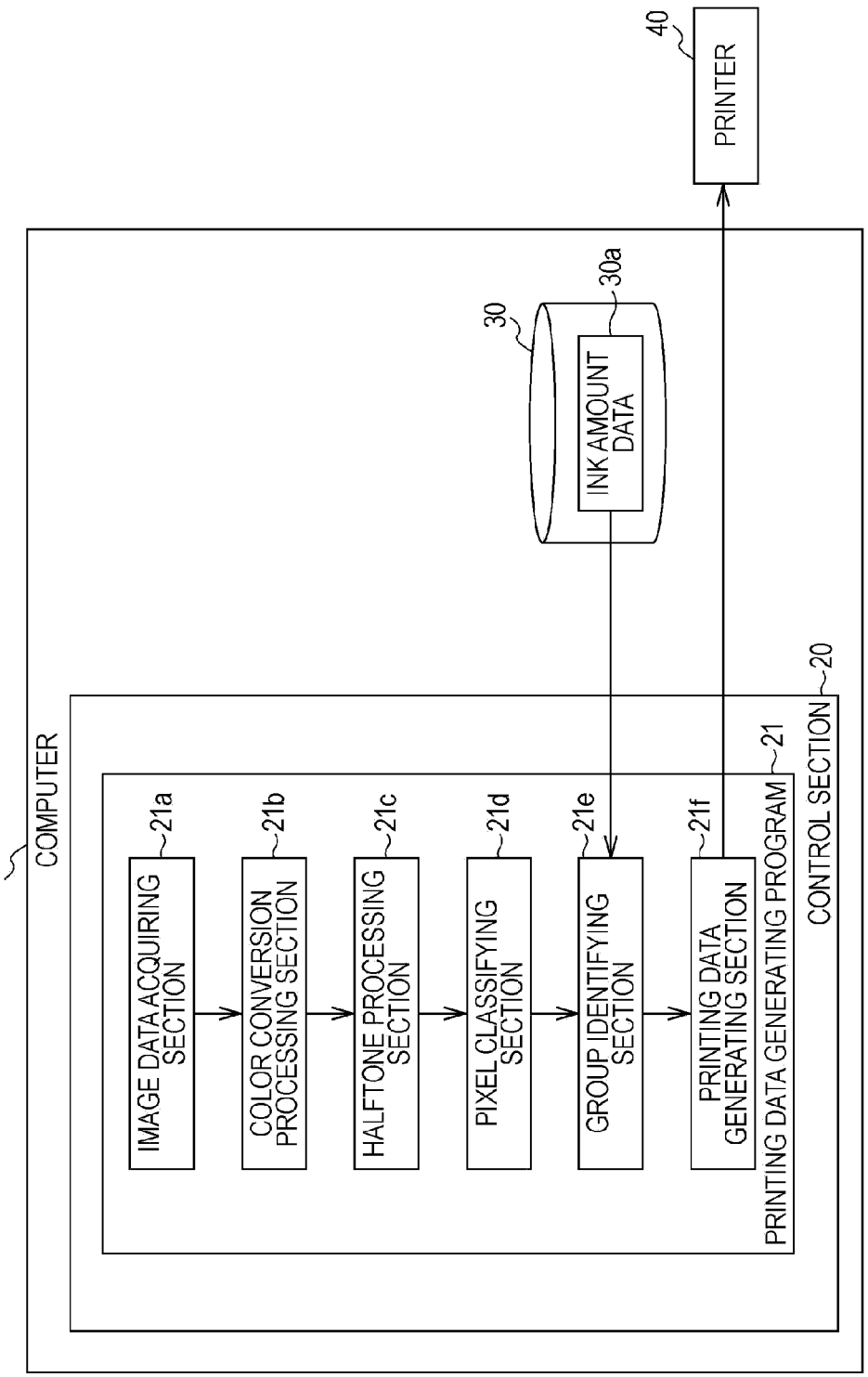
FIG. 1 is a block diagram showing a printing data generating apparatus according to an embodiment of the present invention.

In the following, embodiments of the present invention will be described according to the order listed below.
1. Configuration of Printing Data Generating Apparatus
　1-1. Configuration of Printer
　1-2. Configuration of Printing Data Generating Program and Printing Control Process
2. Other Embodiments
　1. Configuration of Printing Data Generating Apparatus FIG. 1 is a block diagram showing the configuration of a computer 10 serving as a printing data generating apparatus according to an embodiment of the invention. The computer 10 includes a control section 20 including a RAM, a ROM, a CPU, etc., and an HDD 30, and is capable of executing programs recorded in the ROM, the HDD 30, etc., through the control section 20. In this embodiment, a printing data generating program 21 can be executed as one of such programs. The printing data generating program 21 has a function of causing a printer 40, which is connected to the computer 10 through an interface (not shown), to perform printing while reducing misalignment of line position by preventing expansion of a printing medium.

1-1. Configuration of Printer

Figure 2A:
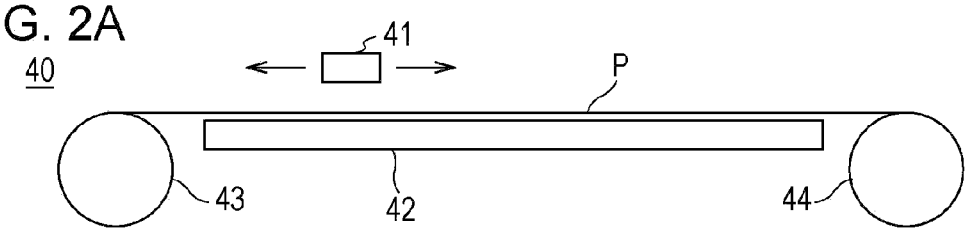
FIGS. 2A and 2B are diagrams each schematically showing the configuration of a printer.
Figure 2B:
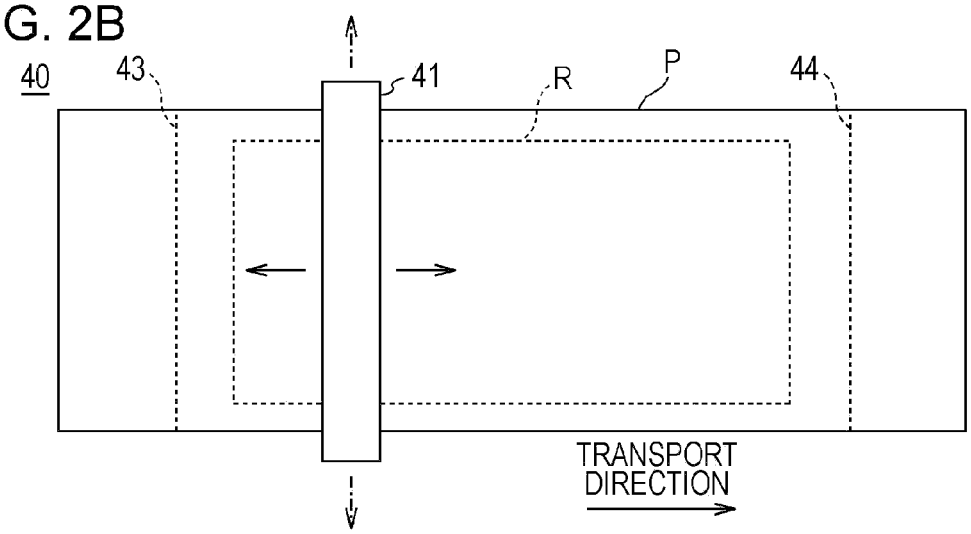

FIGS. 2A and 2B are a side view and a top view, respectively, schematically showing the configuration of the printer 40. In this embodiment, the printer 40 includes two rollers 43 and 44. The printing medium P on the roller 43 is rewound onto the other roller 44 so as to transport the printing medium P onto a platen 42. A print head 41 is disposed above the platen 42. The print head 41 is movable in a plane parallel to the printing medium P on the platen 42 in the direction (the direction of the arrows of the solid lines in FIGS. 2A and 2B) parallel to and the direction (the direction of the arrows of the broken lines shown in FIG. 2B) perpendicular to a transport direction of the printing medium P.

Figure 2C:
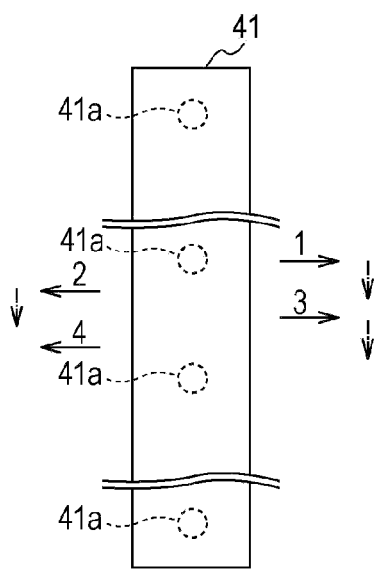
FIG. 2C is a diagram schematically showing a print head.

Further, a plurality of nozzles are formed in the print head 41 such that ink droplets can be ejected from each of the nozzles. FIG. 2C is a schematic top view of the print head 41. In FIG. 2C, nozzles 41a open at a lower surface of the print head 41 are schematically shown by the broken lines. As illustrated in FIG. 2C, the plurality of nozzles 41a are formed at predetermined intervals in the print head 41 in the longitudinal direction of the print head 41. In this embodiment, the ink can be ejected from the nozzles 41a each time the print head 41 is moved by a unit distance in the direction (the direction of arrows of the solid lines in FIGS. 2A and 2B) perpendicular to the direction in which the nozzles 41a are arranged. The operation of moving the print head 41 in the direction perpendicular to the direction in which the nozzles 41a are arranged is called a "main scanning operation". It is to be noted that when the print head 41 reaches the end of the area in which the print head 41 is movable in the main scanning direction by performing the main scanning operation, the print head 41 can be moved by a unit distance in the direction (the direction of the arrows of the broken lines in FIG. 2B) parallel to the direction in which the nozzle 41a are arranged. Then, after the print head 41 has been moved by the unit distance, another main scanning is performed in the reverse direction. Thus, ink droplets can be ejected onto the printing medium P at intervals less than the intervals at which the nozzles 41a are arranged. It is to be noted that the operation of moving the print head 41 in the direction parallel to the direction in which the nozzles 41a are arranged is called a "sub scanning operation".

The overall length of the print head 41 of the printer 40 (the length in the direction perpendicular to the direction of the transport direction of the printing medium P) according to this embodiment is greater than the overall width of the printing medium P (the width in the direction perpendicular to the direction of the transport direction of the printing medium P) as shown in FIG. 2B. By repeatedly performing the above-described main scanning and sub scanning operations, ink can be ejected to a rectangular printing area R shown by the broken lines. Further, the distance by which the print head 41 is moved in the sub scanning operation may be ¼ the interval of the nozzles 41a to obtain a printout with a resolution of four times the pitch of the nozzles 41a in the sub scanning direction.

In the manner as described above, the printer 40 according to this embodiment can eject ink onto the printing medium P each time the print head 41 is moved by a unit distance in the main scanning direction, and can print a plurality of pixels in the main scanning direction. Further, the plurality of nozzles 41a are arranged in the print head 41, and the print head 41 can move in the sub scanning direction. Therefore, the printer 40 can print a plurality of pixels in the sub scanning direction as well. In this embodiment, a plurality of pixels arranged in the main scanning direction on the printing medium P is called a line. Similarly, in image data (described below) representing an image to be printed on the printing medium P, a plurality of pixels arranged in the same direction as the direction of the line on the printing medium P is called a line.

Figure 2D:
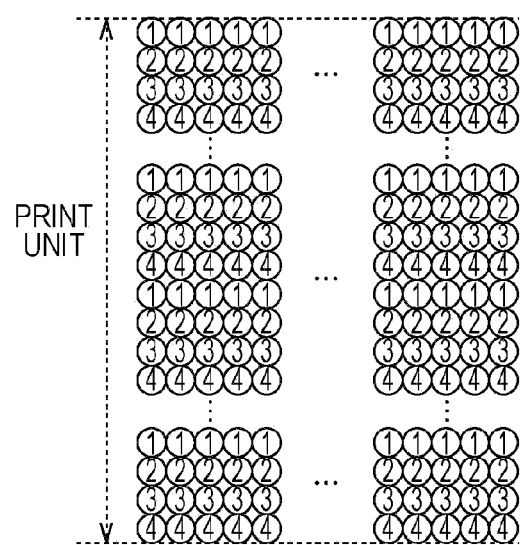
FIG. 2D is a diagram showing pixels printed on a printing medium.

FIG. 2D schematically shows pixels (indicated by circles) on the printing medium P. As shown in FIG. 2D, each line is formed with a plurality of pixels arranged in the lateral direction, and a plurality of lines are arranged in the vertical direction. In this embodiment, as mentioned above, the distance by which the print head 41 is moved in the sub scanning operation may be ¼ the interval of the nozzles 41a to obtain a printout with a resolution of four times the pitch (the above-described predetermined interval) of the nozzles 41a in the sub scanning direction. Accordingly, four lines can be printed within the predetermined interval. In FIG. 2D, an example of the order of main scanning operations for obtaining a printout with a resolution of four times the pitch of the nozzles 41a in the sub scanning direction is shown. That is, in FIG. 2D, the order of main scanning operations is indicated by the numbers shown in the circles. In the example shown in the FIG. 2D, lines are sequentially printed from the top to the bottom.

In the example shown in FIG. 2D, a printing process is illustrated that forms an image by printing a line in the N-th (N is a natural number equal to or greater than 2) main scanning operation between lines printed in the (N−1)-th or earlier main scanning operations, and prints a print unit formed with a plurality of lines by performing Nmax (Nmax is the maximum value of N) main scanning operations. That is, in the example shown in FIG. 2D, a line (i.e., the line indicated by the circles with the number 2 inside) is printed in the second main scanning operation between the lines printed in the first main scanning operation (i.e., the lines indicated by the circles with the number 1 inside). Another line (i.e., the line indicated by the circles with the number 3 inside) is printed in the third main scanning operation between the lines printed in the second and earlier main scanning operations (i.e., the line indicated by the circles with the number 1 inside and the line indicated by the circles with the number 2 inside). Then, still another line (i.e., the line indicated by the circles with the number 4 inside) is printed in the third main scanning operation between the lines printed in the third and earlier main scanning operations (i.e., the line indicated by the circles with the number 3 inside and the line indicated by the circles with the number 1 inside). Thus, when four main scanning operations are performed with each nozzle, lines are printed without leaving space between the lines. That is, in the case where M nozzles are provided, a print unit formed of 4×M lines is printed by performing four main scanning operations. This printing process is performed by, for example, executing main scanning operations with use of the print head 41 shown in FIG. 2C in the order of the numbers on the arrows of the solid lines and executing a sub scanning operation (indicated by the arrow of the single-dot chain line) after completion of each main scanning operation.

1-2. Configuration of Printing Data Generating Program and Printing Control Process Next, a description is given of the configuration of the printing data generating program 21 that controls the above-described printer 40 and a process executed by the printing data generating program 21. The printing data generating program 21 includes an image data acquiring section 21*a*, a color conversion processing section 21*b*, a halftone processing section 21*c*, a pixel classifying section 21*d*, a group identifying section 21*e*, and a printing data generating section 21*f*. A printing control process executed by the printing data generating program 21 starts when a user specifies an image to be printed with use of a user interface (not shown) to issue a printing execution instruction.

In the printing control process, the control section 20 acquires image data by causing the image data acquiring section 21*a* to operate, and adjusts an image according to a print resolution (Step S100). More specifically, the control section 20 acquires image data representing an image to be subject to the printing execution instruction by causing the image data acquiring section 21*a* to operate, and adjusts the number of pixels of the image data so as to print the image at a default resolution. In this embodiment, the number of pixels is adjusted so as to obtain a resolution of four times the pitch of the nozzles 41*a* at least in the sub scanning direction.

Next, the color conversion processing section 21*b* causes the control section 20 to execute a color conversion process for converting an input color system, which is a color system of the image data, into an output color system corresponding to the colors of the inks that can be ejected by the printer 40 (Step S105). More specifically, the control section 20 refers to a previously prepared conversion table (not shown) to perform an interpolation operation and so forth, and converts the color system of each pixel of the image data, the number of pixels of which was adjusted in Step S100, from the sRGB color system into the CMYK color system. Next, the control section 20 executes a halftone process by causing the halftone processing section 21*c* to operate (Step S110). More specifically, the control section 20 generates, for each pixel, data indicative of whether to eject an ink droplet based on the CMYK tone values obtained after the above-described color conversion. The printer 40 according to this embodiment can eject ink droplets of different sizes from the respective nozzles. Therefore, in Step S110, data indicative of whether to eject an ink droplet and also indicative of the ink droplet size are generated for each pixel. It is to be noted that since the data indicative of whether to eject an ink droplet and also indicative of the ink droplet size indicate whether to perform recording with ink at each pixel and also indicate the ink droplet size, the data indicate the ink usage of each pixel.

Then, the pixel classifying section 21*d* causes the control section 20 to execute a process for classifying pixels on the lines to be formed on the printing medium into groups (Step S115). In this embodiment, pixels on lines to be printed in the same main scanning operation are identified based on the order of printing by the print head 41, and the identified pixels are classified into the same group. More specifically, in this embodiment, as shown in FIG. 2D, four lines are printed within a predetermined interval, i.e., the interval of the nozzles 41*a*, by performing four main scanning operations. Then, such a set of four lines is repeatedly arranged in the sub scanning direction. Accordingly, in the lines arranged in the sub scanning direction, a line printed in the same main scanning operation appears every four lines.

Thus, the control section 20 assigns a line number "1" to a line at the top in the data, which are obtained after the halftone processing, indicative of whether to eject an ink droplet, and assigns a line number to each of the subsequent lines such that the line number increases downward in the sub scanning direction. After that, the control section 20 extracts the line numbers which have the same value for X in the case where the line numbers are represented by (an integral multiple of 4)+X (X ranging from 0 to 3). Then, the control section 20 classifies the pixels on the lines indicated by the extracted line numbers into the same group. For example, in the example shown in FIG. 2D, the pixels on the lines with the number 1 are classified into one group; the pixels on the lines with the number 2 are classified into another group; and the pixels on the lines with the number 3 are classified into still another group.

Next, the group identifying section 21*e* causes the control section 20 to execute a process for identifying the group with the highest ink usage required for printing the pixels belonging to the group (Step S120). More specifically, the control section 20 refers to ink amount data 30*a* indicative of the amount of ink to be ejected from the printer 40 based on each datum indicative of the ink droplet size, and identifies the ink usage required for printing each pixel. Then, the control section 20 identifies the ink usage of each pixel classified into the groups in Step S115, and calculates, with respect to each group, the sum of the ink usage of all the pixels belonging to the group. Further, the control section 20 identifies the group with the highest ink usage based on the ink usage of each group identified in the manner described above.

For example, in the case where the ink droplet size can be selected from one of a large dot, a medium dot, and a small dot, and the ink amount data 30*a* indicates that the ink usage for a large dot is 15 ng; the ink usage for a medium dot is 10 ng; and the ink usage for a small dot is 5 ng, if data indicative of the ink droplet size corresponding to a certain pixel indicates a large dot, the ink usage for the pixel is 15 ng. Further, if data indicative of the ink droplet size corresponding to a certain pixel indicates none of a large dot, a medium dot, and a small dot, the ink usage for the pixel is 0 ng. Then, the sum of the ink usage of all the pixels is identified for each group, and the group with the highest ink usage is identified by comparing the sums of the respective groups.

Next, the printing data generating section 21*f* causes the control section 20 to execute a process for generating printing data (Step S125). More specifically, the control section 20 generates printing data for causing the printer 40 to print an image represented by the image data by printing the pixels belonging to the group with the highest ink usage in the fourth main scanning operation. In this embodiment, lines are shifted in the sub scanning direction such that the line formed with the pixels belonging to the group with the highest ink usage are printed in the fourth main scanning operation.

For example, in the case where the line numbers are represented by (an integral multiple of 4)+X (X ranging from 0 to 3), if the group with the highest ink usage is the group of X=0, the group with the highest ink usage is printed in the fourth main scanning operation without performing shifting in units of lines. Therefore, no shifting is performed. If the group with the highest ink usage is the group of X=1, the line is shifted downward by three lines in the sub scanning direction such that the group with the highest ink usage is printed in the fourth main scanning operation. If the group with the highest ink usage is the group of X=2, the line is shifted downward by two lines in the sub scanning direction such that the group with the highest ink usage is printed in the fourth main scanning operation. If the group with the highest ink usage is the group of X=3, the line is shifted downward by one line in the sub scanning direction such that the group with the highest ink usage is printed in the fourth main scanning operation. The direction in which the line is shifted is not limited to the downward direction, and may be the upward direction or both the upward and downward directions.

When the data indicative of the ink droplet size of each pixel are shifted in the manner described above, the control section 20 rearranges the order of the pixels such that the pixels to be printed with ink in each main scanning operation are arranged earlier. Then, the control section 20 generates printing data such that the data of each pixel is transmitted to the printer 40 in the rearranged order, and then transmits the printing data to the printer 40. In response, the printer 40 controls the amount of ink to be ejected from the print head 41 such that the ink usage in the fourth main scanning operation is greater than the ink usage in each of the first through third main scanning operations while performing main scanning operations in the order shown in FIGS. 2C and 2D, and thus performs printing.

With the process described above, expansion of the printing medium P due to the increased penetration of the ink into the printing medium P in accordance with the delay of the timing of performing main scanning operation (e.g., from the first to the fourth main scanning operation) is suppressed, and it is therefore possible to reduce the misalignment of the line positions due to the difference in the timing of performing main scanning operations.

2. Other Embodiments

The above-described embodiment is only an example for carrying out the invention. In the case of printing a print unit formed with a plurality of lines by performing Nmax main scanning operations, as long as the pixels belonging to the group with the highest ink usage can be printed in the Nmax-th main scanning operation, various other embodiments are possible. For example, the pixels of the group with the highest ink usage may be printed in the Nmax-th main scanning operation by changing the order of main scanning operations, instead of shifting the data indicating the ink droplet size in units of lines.

More specifically, in FIG. 2D, in the case where the line numbers are represented by (an integral multiple of 4)+X (X ranging from 0 to 3), the pixels on the lines indicated by the line numbers which have the same value for X are classified into the same group. Then, data indicating the order of main scanning operations are configured such that the pixels belonging to the groups excluding the group with the highest ink usage are printed in the first through third main scanning operations, and that the pixels belonging to the group with the highest ink usage is printed in the fourth main scanning operation. These data are incorporated into the printing data. Then, the printer 40 performs printing according to the data indicating the order of the main scanning operations, so that the pixels belonging to the group with the highest ink usage are printed in the fourth main scanning operation.

Further, in the embodiment described above, the printer 40 includes the print head 41 having a length greater than the overall width of the printing medium P in the sub scanning direction. In an alternative embodiment, a printer including a print head having a length less than the overall width of the printing medium P may be configured to print pixels belonging to the group with the highest ink usage in the Nmax-th main scanning operation. That is, a printer that transports a printing medium P in the sub scanning direction may be configured to print pixels belonging to the group with the highest ink usage in the Nmax-th main scanning operation. In this printer, all the pixels to be printed on the printing medium P may be subject to grouping, or some of the pixels may be subject to grouping. In the latter case, grouping is repeatedly performed to print all the pixels. Thus, when a space corresponding to a predetermined number of lines is formed on the printing medium P, this space may be recognized as a delimiter of the print unit. Then, grouping may be performed for each set of pixels that are present between the delimiters.

What is claimed is:

1. A printing data generating apparatus comprising:
   an image data acquiring unit that acquires image data;
   a pixel classifying unit that classifies, upon causing a printer to execute a printing process for printing a line in an N-th main scanning operation between lines printed in (N−1)-th or earlier main scanning operations and printing a print unit formed with a plurality of lines by performing Nmax main scanning operations wherein N is a natural number equal to or greater than 2 and Nmax is the maximum value of N, pixels on the plurality of lines into groups based on the image data such that each of the groups includes the pixels that are to be printed in a same main scanning operation;
   a group identifying unit that identifies, among the groups, the group with a highest ink usage for printing the pixels belonging to the group based on the image data; and
   a printing data generating unit that generates, based on the image data, printing data for causing the printer to print an image represented by the image data by printing the pixels belonging to the group with the highest ink usage in the Nmax-th main scanning operation.

2. The printing data generating apparatus according to claim 1, wherein
   the printer includes a print head in which a plurality of nozzles are formed at predetermined intervals, and the printing process is configured such that L lines are printed within the predetermined interval by performing L main scanning operations; and
   in a case where line numbers sequentially assigned to the plurality of lines in the order in which the lines are arranged are represented by (an integral multiple of L)+X wherein X is an integer ranging from 0 to L−1, the pixel classifying unit classifies the pixels on the plurality of lines into L groups by classifying the lines having a same value for X into the same group.

3. A printing data generating method for causing to perform printing, said method comprising:
   acquiring image data;
   classifying, upon causing a printer to execute a printing process for printing a line in an N-th main scanning operation between lines printed in (N−1)-th or earlier main scanning operations and printing a print unit formed with a plurality of lines by performing Nmax main scanning operations wherein N is a natural number equal to or greater than 2 and Nmax is the maximum value of N, pixels on the plurality of lines into groups based on the image data such that each of the groups includes the pixels that are to be printed in a same main scanning operation;

identifying, among the groups, the group with a highest ink usage for printing the pixels belonging to the group based on the image data; and generating, based on the image data, printing data for causing the printer to print an image represented by the image data by printing the pixels belonging to the group with the highest ink usage in the Nmax-th main scanning operation.

\* \* \* \* \*